(12) United States Patent
Godsey

(10) Patent No.: US 11,868,974 B2
(45) Date of Patent: Jan. 9, 2024

(54) SYSTEMS, METHODS, AND COMPUTER PROGRAM PRODUCTS PROVIDING PUSH PAYMENTS

(71) Applicant: PAYPAL, INC., San Jose, CA (US)

(72) Inventor: Sandra Lynn Godsey, San Jose, CA (US)

(73) Assignee: PayPal, Inc., San Jose, CA (US)

(*) Notice: Subject to any disclaimer, the term of this patent is extended or adjusted under 35 U.S.C. 154(b) by 479 days.

(21) Appl. No.: 17/001,460

(22) Filed: Aug. 24, 2020

(65) Prior Publication Data

US 2021/0042718 A1    Feb. 11, 2021

Related U.S. Application Data

(63) Continuation of application No. 15/900,724, filed on Feb. 20, 2018, now Pat. No. 10,755,244, which is a continuation of application No. 13/537,217, filed on Jun. 29, 2012, now Pat. No. 9,898,719.

(51) Int. Cl.
| | |
|---|---|
| *G06Q 20/00* | (2012.01) |
| *G06Q 20/08* | (2012.01) |
| *G06Q 20/32* | (2012.01) |
| *G06Q 20/34* | (2012.01) |
| *G06Q 20/40* | (2012.01) |
| *G07F 7/08* | (2006.01) |

(52) U.S. Cl.
CPC ......... *G06Q 20/08* (2013.01); *G06Q 20/3276* (2013.01); *G06Q 20/353* (2013.01); *G06Q 20/401* (2013.01); *G07F 7/0873* (2013.01)

(58) Field of Classification Search
CPC .......................... G06Q 20/08; G06Q 20/3276
See application file for complete search history.

(56) References Cited

U.S. PATENT DOCUMENTS

| | | | |
|---|---|---|---|
| 8,438,063 B2 | 5/2013 | Albisu | |
| 8,583,496 B2 | 11/2013 | Yoo | |
| 8,662,384 B2 | 3/2014 | Dodin | |
| 9,898,719 B2 | 2/2018 | Godsey | |
| 2005/0177510 A1* | 8/2005 | Hilt | G06Q 20/10 705/40 |
| 2007/0203836 A1* | 8/2007 | Dodin | G06Q 20/223 705/44 |

(Continued)

OTHER PUBLICATIONS

"Fear not! Let's Get You on the Right Path, My Friend", Consumer help and FAQ's, Zong PayPal Service, printed from http://www.zong.com/help on Jun. 1, 2012, 3 pages.

(Continued)

*Primary Examiner* — Rokib Masud
(74) *Attorney, Agent, or Firm* — Haynes and Boone, LLP

(57) ABSTRACT

In electronic financial transactions a receiver, or targeted recipient of funds, provides account information to a transmitter, or sender of funds. The transmitter initiates a push of funds from a transmitter funding source to the receiver's funding source processor. In some embodiments the receiver provides a payment card, similar to a credit card, which is read by an electronic device of the transmitter, such as a smart phone. In some embodiments, the receiver provides the account information by way of a bar code, such as a QR code, which is scanned and read by the transmitter's electronic device.

20 Claims, 13 Drawing Sheets

(56) References Cited

U.S. PATENT DOCUMENTS

| | | | | |
|---|---|---|---|---|
| 2012/0054046 A1* | 3/2012 | Albisu | ............... | G06Q 20/425 |
| | | | | 705/16 |
| 2012/0173348 A1* | 7/2012 | Yoo | ..................... | G07F 9/001 |
| | | | | 705/16 |
| 2014/0297439 A1* | 10/2014 | Hasson | ............... | G06Q 20/325 |
| | | | | 705/21 |

OTHER PUBLICATIONS

"Just Two Steps. Boom, You're Done", Mobile payments—buy digital goods online in two steps, Zong PayPal Services, printed from http://www.zong.com/mobile-payments on Jun. 1, 2012, 2 pages.

\* cited by examiner

SYSTEMS, METHODS, AND COMPUTER PROGRAM PRODUCTS PROVIDING PUSH PAYMENTS

CROSS-REFERENCE TO RELATED APPLICATION

This application is a continuation of and claims priority to U.S. patent application Ser. No. 15/900,724, filed Feb. 20, 2018, which is a continuation of U.S. patent application Ser. No. 13/537,217, filed Jun. 29, 2012, now U.S. Pat. No. 9,898,719, issued Feb. 20, 2018, which is incorporated herein by reference in its entirety.

BACKGROUND

Technical Field

The present disclosure generally relates to electronic transactions, and more particularly, to techniques for pushing payments to merchants.

Related Art

It is common for consumers and businesses to have electronic accounts to send and receive payments from other parties. One example includes credit cards, which are typically read electronically and transfer money electronically. Another example is a payment provider, such as that offered under the name PayPal™, which provides electronic wallets that users can link to credit cards, bank accounts, and any other form of payment.

These methods of payment, whether electronic or otherwise, can be prone to fraud. For instance, it is not uncommon for criminals to steal credit card information and then to attempt to use the credit card information to pay for goods and services. A typical, modern credit card theft scenario involves a consumer's card that is compromised in some fashion and then canceled and replaced by the card issuer relatively quickly.

While the consumer is not typically obliged to pay for the criminal's purchases for a compromised credit card, the consumer still feels some inconvenience. By contrast, theft of bank account credentials may be more damaging to a consumer. Furthermore, the advent of wireless payments at Points of Sale (POSs) makes some consumers nervous that their account numbers, passwords, security codes, and other account credentials may be acquired by thieves skimming wireless transactions. Encryption and other measures may make the thieves' activities more difficult to accomplish successfully. However, encryption alone is not fraud-proof.

At the heart of such fraud is the ability of thieves to take a consumer's account credentials and then use the credentials in subsequent unauthorized transactions. Conventional transactions usually involve the consumer passing his or her account credentials to a merchant, and the merchant then uses the credentials to receive payment from a payment provider. For instance, a consumer may present a credit card to a merchant, and the merchant swipes or otherwise reads the card to acquire the credit card number and other information, such as a security code or expiration date. The merchant then presents the consumer's credentials to a payment provider for payment. It is the presentation of the consumer's credentials to the merchant that puts the consumer at risk, as the consumer's credentials may be stolen. Transactions, whether in person at a POS or over the phone or Internet could benefit from measures to decrease theft.

DETAILED DESCRIPTION

Figure 1:
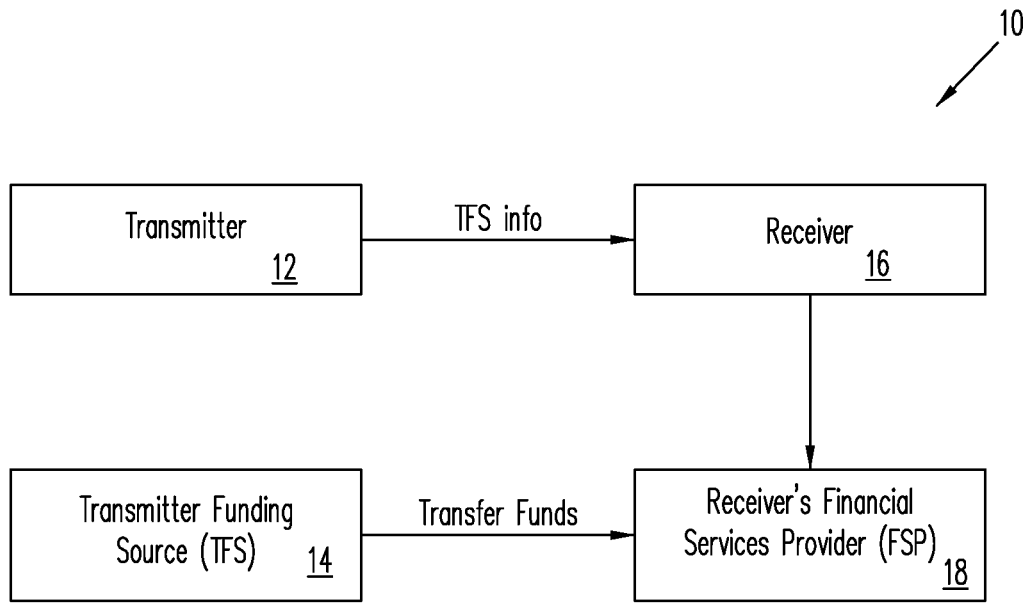
FIG. 1 illustrates a prior art system for transaction of funds between two parties.

It is to be understood that the following disclosure provides many different embodiments, or examples, for implementing different features of the present disclosure. Specific examples of components and arrangements are described below to simplify the present disclosure. These are, of course, merely examples and are not intended to be limiting.

According to the various aspects of the present disclosure, a method, system, and computer program product are discussed below that may help to decrease fraud in some instances. Various embodiments of push payment processing are presented that provide convenience and privacy to the consumer or payer allowing payment from their account without providing their private, specific account information to a payee.

Push payments are a shift in the current payment processing flow to avoid provision of transmitter, or payer, information to the receiver, payee. Push payments initiate when a receiver, such as a merchant, provides transaction information to the transmitter, such as a buyer; the transaction information includes specifics of the transaction, such as cost of goods, and also includes receiver account information. The receiver account information identifies the receiver's account where the payment for the goods is to be credited by the transmitter. In one example, the merchant provides a communication to the buyer indicating the price of the good for purchase, a descriptor of the good, and the merchant's account information for payment. The buyer receives this information (at an electronic device) and communicates this information to the buyer's funding source. The buyer's funding source then transfers the funds to the merchant's account. In this way, the merchant does not receive the private funding source information of the buyer. While the merchant is required to provide their account information, this account may be designated as deposit only and thus prevent fraud.

The processing also simplifies the process for the payee, as they are the recipient of the funds without verifying credit or other status of the payer. The push payments reduces the information that is typically required to prove authenticity of the credit card or payer information, such as to provide photo ID, zip code, or other identifier required by the payment provider. The payee provides a deposit account or recipient location for a payment to multiple payers, rather than the current process where each payer provides their specific information to the payee. In this way, the private information of the payee is protected. As more and more commerce is done using a smart phone or other mobile device, the push processing may be implemented in a module on the smart phone, or a module that may be used with the smart phone, such as a dedicated memory device.

Further advantages allow for electronic receipts, tracking of payments, coordination with digital wallet technologies, and other automated processes. The payer originates the push payment and is able to limit the access to their private information, and therefore may coordinate their financial information with confidence. This offers benefits to the payer as allowing payment without offering credit card or other personal information to a payee. As the payer is often an individual, the payer is often less able to protect the security of their payment information. Push payment methods process the payee's deposit information to facilitate the transaction and thus places the security risk with those parties that are typically better able to provide security.

In some embodiments of the present disclosure an electronic device including an input/output interface is operable to receive an input from a user and communicate an output to the user. The electronic device includes a transceiver operable to electronically communicate with a computer network and a computer processor operable to execute instructions. Further, the electronic device includes a memory storage operable to store the instructions, the memory storage further comprising a program module that is operable to facilitate push payments from the device to a recipient of funds. The push payment accessing a funding source associated with the user of the electronic device.

In one example, a push payment is made between a purchaser and a seller, such that the seller provides a target account to which the purchaser pushes the payment for goods or services. The purchaser may choose to use push payment for a transaction, which requires the seller to provide account information or some identifier of where to push the payment. The seller may have a deposit card, similar to a credit card which may be scanned by a reader on an electronic device of the purchaser.

In another example the push payment is made from a contributor to a charity, wherein the charity provides deposit account information to the contributor, and the contributor initiates a push of funds to the deposit account. The contributor makes the contribution from an electronic device, such as a mobile device or computer device, wherein the electronic device requests the deposit account information from the charity and initiates a push payment by sending instructions to the contributor's payment source or payment provider. The contributor sends the deposit account information to the payment provider, and in response the payment provider pushes the payment to the deposit account. The payment provider may implement methods and mechanisms for verifying the authenticity of the deposit account, so as to avoid fraud. Once the payment has been pushed to the deposit account of the charity, or confirmed as scheduled for payment, the payment provider sends a confirmation message to the electronic device; the electronic device then may send a confirmation message to the charity. In another embodiment, the charity receives a confirmation from the deposit account that the money has been deposited or is scheduled for deposit. In one embodiment the confirmation is sent to the electronic device and the charity from the payment provider. The charity also has an electronic device to facilitate the transaction.

In one example, a consumer has an account, such as a debit card account, a credit card, an electronic wallet (e.g., as provided by PayPal™), and/or the like. The consumer can use the account to pay for transactions via a user device, a merchant device, or a third party device, whether over a network or in-person. Similarly, merchants also have accounts where they receive payments from payment providers (e.g., banks or other payment services). In a conventional consumer transaction scenario, the consumer pays a merchant by presenting his or her account credentials to the merchant, where the merchant uses the consumer's account credentials to receive payment at a payment provider. The payment provider processes the payment by scheduling a money transfer to the merchant's account commensurate with the transaction, assuming the credentials presented by the merchant are valid.

By contrast, various embodiments described herein provide for the merchant presenting its account credentials to the consumer. The consumer, via a mobile application or other program, then presents the merchant's credentials to the consumer's payment provider along with, e.g., an indication of the amount of the transaction. The consumer's payment provider then schedules a money transfer to the merchant's account and provides a verification of the payment to the merchant and consumer. The consumer receives the goods or services that are the subject of the transaction, and the merchant receives payment. In the above example, the consumer pushes payment to the merchant, rather than the merchant pulling payment from the consumer.

In the example above, the consumer did not present his or her account credentials to the merchant, thereby reducing the chances of those credentials being stolen. The consumer receives the benefit of the safer transaction and the merchant benefits by providing its customers with increased confidence in the security of the transaction.

Thus, various embodiments reduce the risk in the transaction by protecting the confidentiality of the consumer's account credentials. Nevertheless, the merchant's credentials are exposed and potentially subject to misappropriation. Various techniques may be used in some embodiments to ensure that the merchant's credentials are not stolen. For instance, the merchant and consumer may communicate via infrastructure that is encrypted, such as an encrypted Wi-Fi connection or Near Field Communication (NFC) connection.

Additionally or alternatively, the merchant (or the merchant's bank) may attach rules to the account(s) for which the credentials are exposed. Examples of rules include limitations that prevent or otherwise restrict outbound transfers of money. For instance, if a merchant uses an account that is restricted only to deposits, then even if a thief acquires the account credentials, the thief cannot use the credentials to access the money in the account. In fact, some embodiments including deposit-only accounts for merchants may dispense with some other security measures and place the merchant's account credentials in a non-secret public place, such as encoded in a bar code or Quick Response (QR) code in full view of the public.

In one use example, a consumer walks into a brick and mortar store and finds an item that the user desires to purchase. The consumer takes the item to the POS, where the POS scans the item and then provides the item's information to an application running on the consumer's mobile device, or the consumer may scan the item herself with the mobile device and then provide the item's information to the POS. In any event, the consumer's mobile device has an application that receives information about the transaction, such as cost. The merchant provides its account credentials to the application running on the consumer's mobile device, and the application presents the account credentials to its payment provider to schedule payment. Both parties desire a confirmation that the transaction is completed, and a confirmation message may be sent from the payment provider to the mobile application to forward to the POS, or the payment provider may send the confirmation message to the POS first to forward to the mobile application, or the payment provider may send the confirmation to both the POS and the mobile application separately.

The scope of embodiments is not limited to brick and mortar shopping. In another example, the consumer shops online, rather than at a brick and mortar store. The consumer may shop using a desktop computer, tablet computer, smartphone, or other device to shop online. At checkout, instead of the consumer entering her account credentials, the merchant provides its account credentials. The consumer may then present the merchant's account credentials along with other transaction information to her payment provider using the same computing device or a different computing device, whether fixed or mobile. Once payment has been processed, the payment provider provides a confirmation message to one or both of the parties to the transaction. Once both parties are satisfied that the transaction is complete, the parties may then disconnect their communication session.

FIG. 1 is a block diagram illustrating a prior art system 10 for transmission of funds from a transmitter to a receiver. The transmitter 12 initiates the transaction by providing the Transmitter Funding Source (TFS) information to the receiver 16. The transmitter 12 and the receiver 16 are electronic devices representing each of the parties to the transaction. The transaction is performed or completed through the electronic devices. The receiver 16 receives the TFS information, which may be credit card information or other financial information such as in the form of typical Automated Clearing House (ACH) messaging of a routing number, account number, check number or other funding source identification. The receiver 16 provides the TFS information with the receiver's Financial Services Provider (FSP) 18 to request the payment from the TFS 14. The FSP 18 includes information about a Receiver Account (RA) for receiver 16. The FSP 18 communicates with the TFS 14 to facilitate the transfer of funds. In response, TFS 14 provides the payment, or transfer of funds, to the receiver FSP 18. This processing may involve other parties during the communication between TFS 14 and FSP 18. The TFS 14 is an electronic system(s) that maintains accounts for users and has capability for communication with electronic systems used by other funding sources and financial service providers. The FSP 18 maintains the receiver's financial account, and includes an electronic system for communicating with electronic systems used by other financial service providers. Once the FSP has received the transfer of funds, or a commitment that the funds are scheduled for transfer, the FSP 18 provides a confirmation to the receiver 16. The receiver 16 then provides such confirmation to the transmitter 12 and the transaction is complete. In one example, the receiver 16 is a merchant of goods and the transmitter 12 is a buyer of goods; the transaction is the purchase of a merchant good by the buyer.

Figure 2:
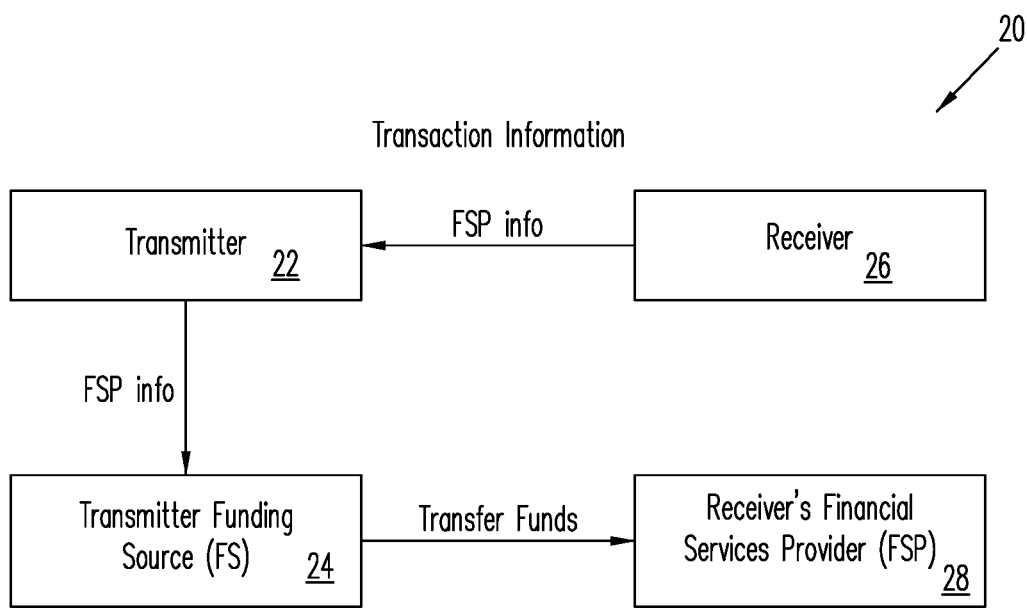
FIG. 2 illustrates a system for transaction of funds between two parties using push payments according to example embodiments.

In contrast to the prior art system of FIG. 1, FIG. 2 is a block diagram illustrating a push payment type system 20 for transmission of funds from a transmitter to a receiver. When the transmitter 22 and receiver 26 desire to transfer funds from the transmitter 22 to the receiver 26, such as in a commerce transaction, the receiver 26 initiates the transaction and provides FSP information, which may include RA information, to the transmitter 22. In an example embodiment the receiver provides the FSP information as an indicia on a card, similar to a credit card, on a special code like a bar code or QR code at the receiver electronic device, or presents the information to the transmitter electronic device. The transmitter 22 then provides the FSP information and fund transfer instructions to the TFS 24 to instruct the payment of funds to FSP 28. In one embodiment, the FSP information and fund transfer instruction is provided in one message; in another embodiment the FSP information and the fund transfer information is exchanged in multiple parts. The transmitter 22 and the receiver 26 are electronic devices representing each of the parties to the transaction. The transaction is performed or completed through the electronic devices. The transmitter 22 receives the FSP information from receiver 26, which may be in the form of typical Automated Clearing House (ACH) messaging of a routing number, account number, check number or other funding source identification. The transmitter 22 processes the FSP information to enable the transfer of funds, or payment, to the FSP 28. In response to receipt of funds, or confirmation that such transfer is to take place, the FSP 28 provides confirmation messaging to the receiver 26. There may be a variety of messaging scenarios to confirm to the receiver 26 and/or the transmitter 22. The TFS 24 is an electronic system(s) that maintains accounts for users and has capability for communication with electronic systems used by other funding sources and financial service providers. The FSP 28 maintains the receiver's financial account, and includes an electronic system for communicating with electronic systems used by other financial service providers. The receiver 26 then provides such confirmation to the transmitter 22 and the transaction is complete. In one example, the receiver 26 is a merchant of goods and the transmitter 22 is a buyer of goods; the transaction is the purchase of a merchant good by the buyer.

Figure 5:
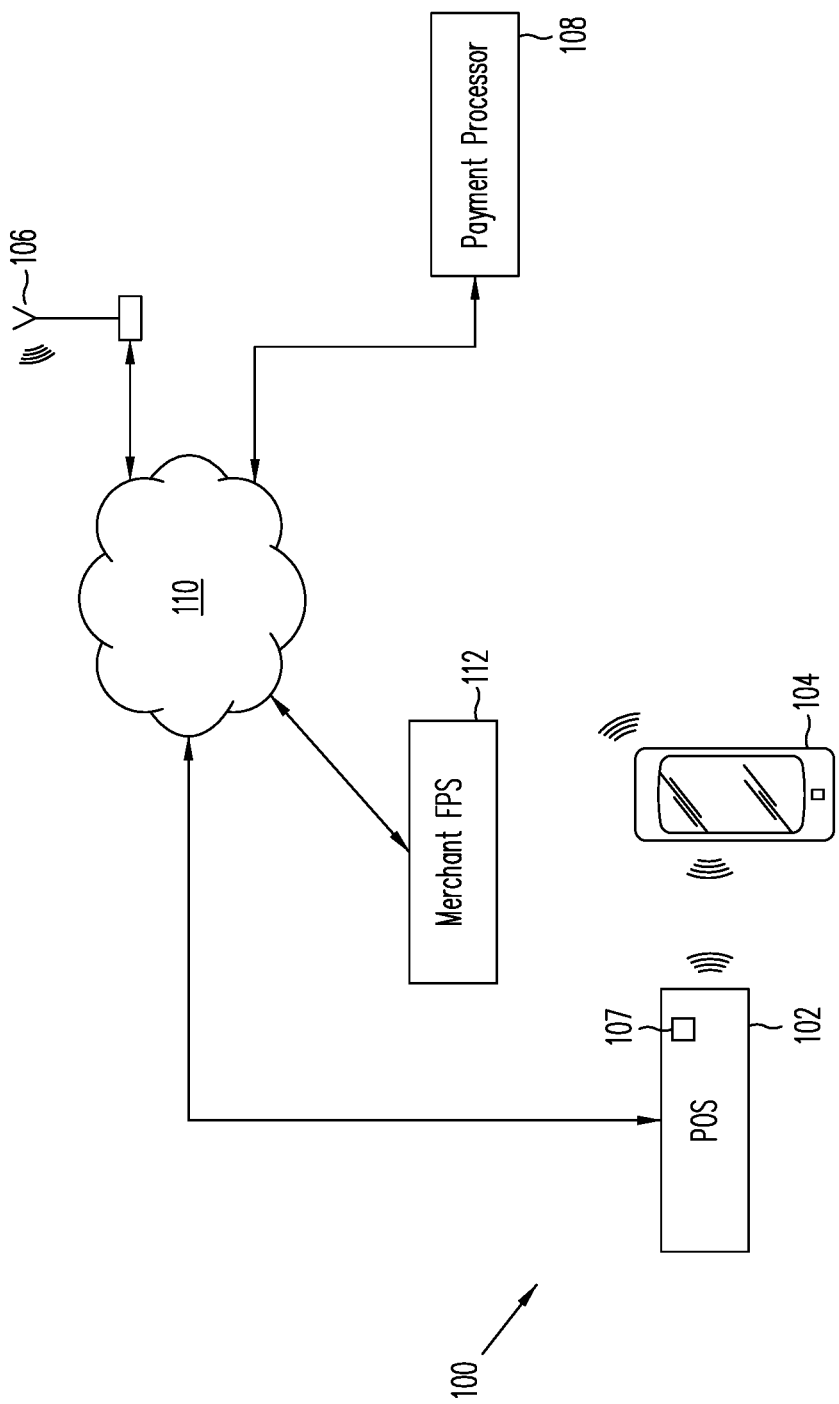
FIG. 5 illustrates an example system for making a push payment at a merchant point of sale.

FIG. 5 is a simplified diagram of an example system 100 using push payments from payment processor 108 to Point of Sale (POS) 102. In this scenario a consumer, purchaser, or other party desiring to transfer funds to the account of another party, is using a mobile device 104. The mobile device 104 has data transfer capability and is able to process messages and information between multiple systems. The POS 102 has similar capabilities to communicate with multiple systems. These systems may communicate over a networked system, such as over the Internet, or through a local network or cellular network.

Figure 3:
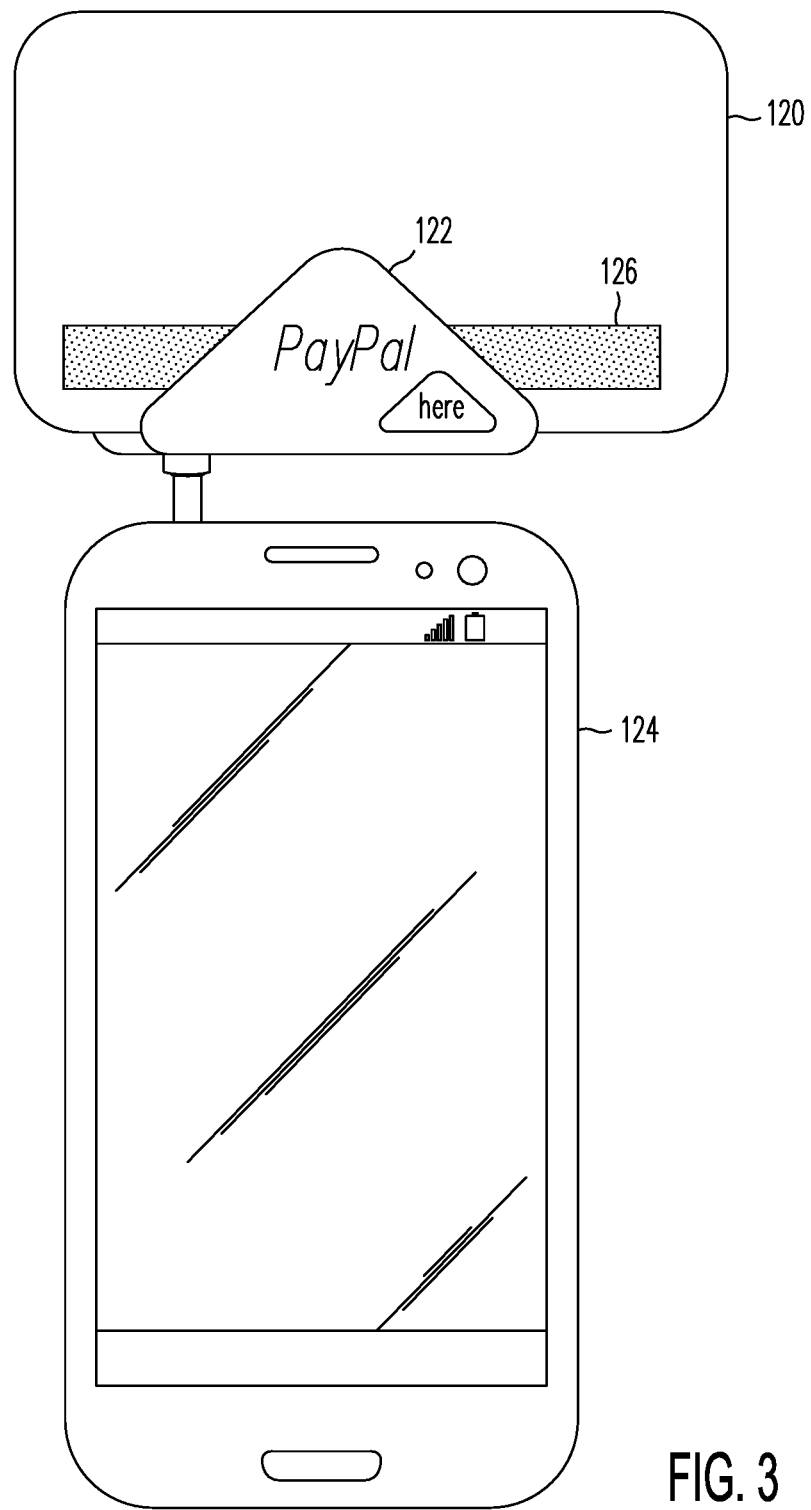
FIG. 3 illustrates a Push Payment card according to example embodiments.
Figure 4:
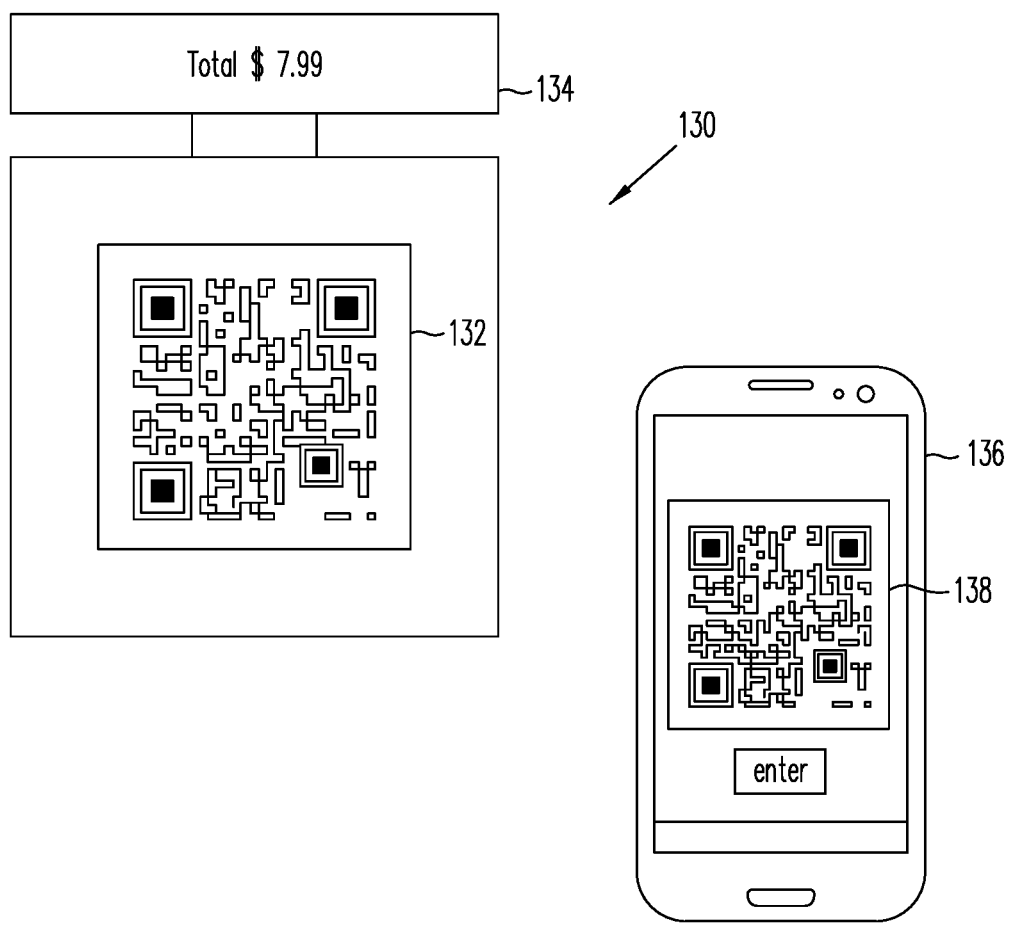
FIG. 4 illustrates a Push Payment indicia on an electronic sales device according to example embodiments.

FIGS. 3 and 4 are illustrations of two example payment scenarios that may be employed in some embodiments.

FIGS. 3 and 4 are offered as examples of techniques for a user device (such as a smartphone) to read a payee's account credentials. FIG. 5. In FIG. 3, smartphone 124 has a peripheral device 122 for swiping payment card 120. Examples of such peripheral devices include those offered under the names Here™ (available from PayPal, Inc.) and Square™ (available from Square, Inc.). The user of the smartphone 124 swipes card 120 so as to cause peripheral device 122 to read magnetic strip 126 and then to use information read from magnetic strip 126 to make payment to a merchant or other payee. In this example scenario, card 120 presents credentials for a deposit-only account of the payee, or other account that accepts deposits. The payment card 120 may incorporate a variety of means to store and provide the information to the receiving device, such as device 122. In some examples, the payment card 120 may be a smart card with stored memory and/or communication capabilities, or may be an Near Field Communication (NFC)-compatible card.

Similarly, FIG. 4 shows smartphone 136 proximal to a POS 130, where POS 130 has a QR code 132 displayed thereon. The consumer can see the total of the transaction displayed upon POS display 134. The consumer uses camera functionality of smartphone 136 to capture an image 138 of QR code 132. Smartphone 136 reads QR code 132 and uses the information read from QR code to access a database or other utility to acquire the account credentials of the payee. FIGS. 3 and 4 are examples, and it is understood that the scope of embodiments includes any appropriate manner of accessing payee account credentials.

Returning to the example of FIG. 5, mobile device 104 uses a wireless technology to communicate with POS 102, e.g., to exchange transaction information and to receive merchant account credentials therefrom to complete payment for a transaction. Mobile device 104 then communicates with payment provider 108 (e.g., PayPal™ or a bank) to instruct payment provider 108 to schedule a payment from an account of the consumer to an account of the merchant.

Further, as shown in FIG. 5, mobile device 104 has capability to communicate via network 110 (e.g., the Internet, a cellular network, and/or the like) wirelessly. Mobile device 104 is illustrated communicating through wireless base station 106, which may be a Wi-Fi access point, a cellular tower, or other facility. Thus, mobile device 104 may communicate wirelessly with both the POS 102 and the payment provider 108. However, the scope of embodiments includes wired communication and other communication methods.

In the illustrated embodiment, mobile device 104 may include a smart phone, notebook computing devices, or other hand-held device. In some embodiments, mobile device 104 may be another suitable electronic device such as a computer tablet or laptop personal computer. The consumer may access an interface on mobile device 104 through a web browser, a specialized application, or other appropriate technique. For instance, a consumer may download application software programs, also known as "apps" or "applications" to the mobile device 104. In general, applications are computer software programs designed to execute specific tasks. As examples, Apple's® App Store, Microsoft's Windows® Store, and Google's Android Market® are examples of Internet stores that offer a multitude of applications, including entertainment programs, business applications, file management tools, and other widgets, etc. POS 102 is shown as including indicia 107 for providing the merchant's account credentials. As used herein account credentials indicates the information that is used to facilitate payments to an account maintained at a financial service provider. This may include the ACH processing information, on-line payment provider information, banking information, credit card information, or other payment provider information. Indicia 107 may be information to effect the display of information at the POS, such as the information corresponding to a QR code, a bar code, or other optically or wirelessly readable presentation of the account credentials. In some embodiments, the indicia 107 is a physical sticker or other display means, wherein the merchant may place a sticker on or near the POS with a QR code (as in FIG. 4) or bar code that when read optically provides the merchant's account credentials to an app on mobile device 104. In some embodiments, the merchant provides this information on a website page for display to a consumer, wherein the consumer's device may scan the information displayed and use this information to push payments to the FSP 28. In some embodiments, the POS 102 may include a Radio Frequency ID (RFID) tag as indicia 107 that when read using RF radiation provides the merchant's account credentials to the app on mobile device 104. In some embodiments, indicia 107 is provided on a magnetic card, similar to a credit or debit card, that when read magnetically or otherwise provides the merchant's account credentials (as in FIG. 3). For instance, the mobile device 104 may include a magnetic card reader to read a deposit-only account card of the merchant. Such a card is referred to herein as a Push Card as it enables another party to make fund transfers to the account.

There are a variety of techniques to provide account credentials to mobile device 104, and any appropriate manner of conveying account credentials now known or later developed may be adapted by one or more embodiments. Furthermore, account credentials may include any information that may be used to identify or access an account, such as an account number, an expiration date, a security code, user identification and password, and the like. In scenarios wherein confidentiality of the merchant's credentials is not a foremost concern, public information, such as the merchant's phone number or email address, may even be used as account credentials. The account credentials may be biometric information that is read by an electronic device and mapped or otherwise associated with a financial account.

In some embodiments, the merchant's account is restricted to provide security for the merchant. For instance, a merchant accounts may be stipulated as deposit-only. In some embodiments there are rules governing the merchant's account, such as to allows refunds to a consumer during a single transaction. In other embodiments, the merchant accounts may have more or fewer restrictions or even different restrictions as appropriate. In this case the merchant is the receiver and the consumer is the transmitter. The FSP may provide capability to apply rules to the RA of the merchant. This prevents fraudulent access to the merchant account. By allowing the consumer to push the payment to the merchant, the consumer is protecting their sensitive account information and thus avoiding large scale fraud on one or more consumers.

In some embodiments, the transmitter and receiver use the same payment provider, wherein the payment processor 108 of the consumer is the payment provider of the merchant as well. In some embodiments, the payment providers are on-line payment providers which process payment without a credit card; in one example the merchant has an online payment account, such as a PayPal™ account, where the money is debited from the consumer account and credited to the merchant account.

Some embodiments provide for electronic funds transfer at the POS, others provide for transfer through a website, such as a webstore, others provide for transfer through mobile devices or other electronic devices. In each of these embodiments, the receiver provides the RA information to the transmitter and the transmitter pushes the payment electronically to the receiver. Confirmation is made to the parties that such transfer has occurred. For processing remotely, such as where consumer is not at the location of the physical location of the store, the recipient may be asked to submit or present credentials to the transmitter's electronic device, This is in contrast to prior art methods where the consumer is asked to enter their payment information. The financial service provider system communicates electronically with the TFS system and may be processing in the background with limited interaction of the human participants to the transaction. In some embodiments, the credentials are not displayed but are merely used by the electronic device processing the transaction.

Continuing with FIG. 5, when mobile device 104 has a network connection either by Wi-Fi or cell phone carrier, an application on mobile device 104 can request payment provider's 108 servers to schedule payment to the merchant's account. For instance, during a transaction, the consumer may cause the application on mobile device 104 to send appropriate information to payment provider 108 to schedule the transaction. Such appropriate information may include, but is not limited to, the merchant's account credentials, a merchant identification, electronic contact information of the merchant, a transaction amount, a description of the transaction (e.g., type of goods or services sold and a transaction identification number), and/or the like. In some embodiments, the mobile device has capability to scan indicia, such as a bar code or other source of information provided at the POS, to facilitate a transaction.

Continuing with the example of FIG. 5, mobile device 104 may communicate as appropriate with POS 102 to facilitate the transaction. For instance, either or both of POS 102 and mobile device 104 may be capable of scanning a code on (or otherwise identifying) items being purchased by the consumer, and thus, responsibilities for identifying the items may be divided between the POS 102 and mobile device 104 in any appropriate manner. For instance, initiating the transaction may include the POS 102 scanning a bar code on an item and/or may include the application on the mobile device 104 scanning a bar code on the item. POS 102 and mobile device 104 may then exchange information as desired. In some embodiments, the POS 102 includes an analysis module to identify the consumer by telephone number of other consumer-specific information. The analysis module may be used provide discounts or other incentives to a specific consumer. In some embodiments the analysis module may identify a regular or frequent or preferred customer and provide a discounted price or a shipping benefit to that customer.

Furthermore, to complete the transaction, the payment provider 108 may communicate over network 110 to provide a transaction confirmation message to one or both of POS 102 and mobile device 104. In some embodiments the merchant may prefer a confirmation message directly from payment provider 108 in order to prevent fraud. In some embodiments, the merchant will only accept push payments from trusted payment providers whose identities can be verified by a digital certificate or the like. Such an arrangement allows a merchant to be confident in the identity of payment provider 108 and to know that payment provider 108 has indeed scheduled a payment when payment provider 108 confirms the transaction.

The scope of embodiments is not limited to the exact configuration shown in FIG. 5. For instance, the merchant associated with POS 102 has an account to receive payment, and the account may be kept by payment provider 108 or a different payment provider merchant's FSP 112. In a scenario wherein the merchant's bank account is kept by a merchant's FSP 112, which is a different payment provider from payment provider, 108, then payment provider 108 and the different payment provider may communicate over network 110 or a different network to transfer the funds from consumer to merchant. Where the consumer and merchant have a common financial services provider the communication is simplified further as the consumer's electronic device receives the merchant credentials and provide these to the financial services provider, who then completes the transaction by debits and credits accordingly. In this case, the common financial services provider may send confirmation to both parties.

As both the mobile device 104 and the POS 102 have communication capabilities, some embodiments involve a variety of communications. For example, the POS 102 may send information to the mobile device 104 including information about the product information, suggested or similar products, specials and discounts, payment plans, shipping options, and so forth. When the information received identifies the various payment options, the POS 102 also provides sufficient information for the mobile device 104 to be used to initiate the payment according to one or more of these options.

The communication between the financial service providers may be implemented in a variety of ways. The communication may follow a flow similar to the messaging procedures of ACH processes, or may implement a specific financial transaction processing. The communication may use a a method similar to that implemented by PayPal for on-line payments, wherein the identifier for the transaction is the on-line ID, such as an email address or a telephone number; in these situations the on-line payment processor will process the transfer of funds, such as by credits and debits. The on-line payment processor's account for the merchant may be a deposit-only account, to provide added protection against fraud.

The communication between entities in the transfer of funds, such as financial service providers, processors and their agents and intermediaries, may involve encrypted communications with handshaking between entities. A variety of security mechanisms may be implemented to make the push payment flow more secure.

Figure 6:
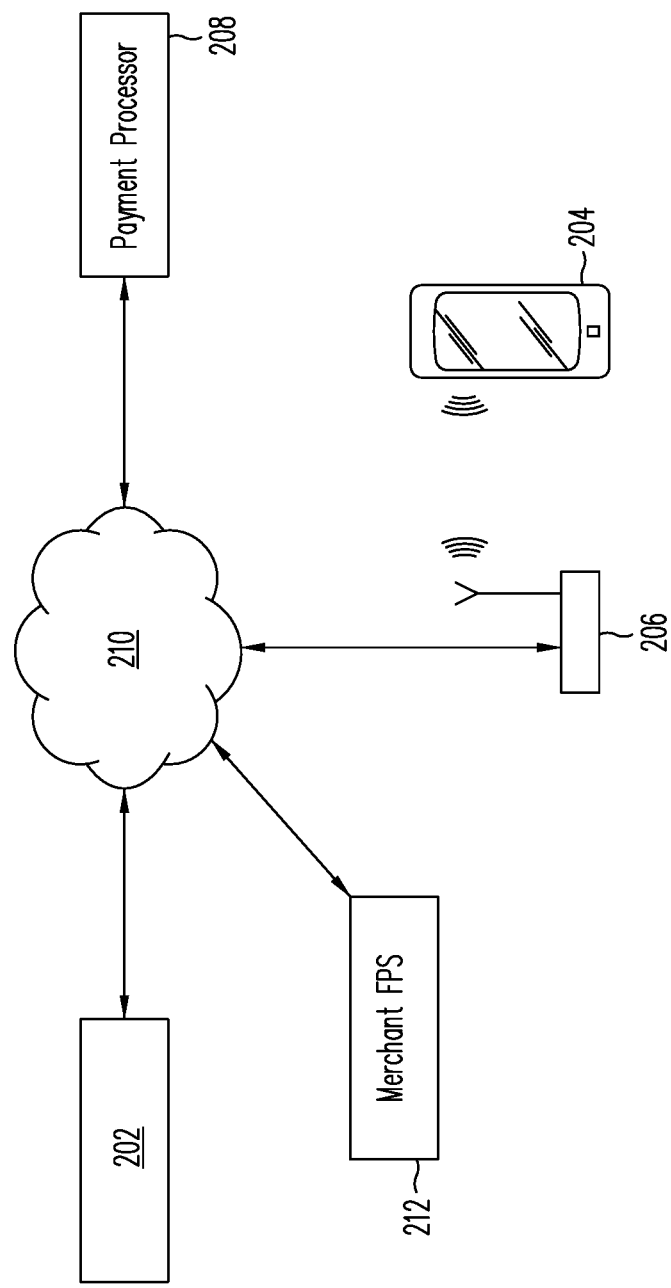
FIG. 6 illustrates an example system for making a payment for an online transaction.

FIG. 6 is a simplified diagram of an example system 200 for implementing a push payment method from a consumer through payment provider 208 to a merchant FPS 212 associated with a merchant 202. Whereas FIG. 1 focuses on an example POS transaction, FIG. 6 focuses on an example mobile online transaction, where a user interfaces with the Internet store through a mobile device 204

The illustrated embodiment of FIG. 6 illustrates a configuration according to an example embodiment where the consumer uses mobile device 204, though in alternative embodiments, the consumer may use another suitable electronic device such as a desktop computer, server computer, or other computer that is not necessarily mobile. The consumer may access e-commerce facilities of merchant 202 through a web browser (as in the example below), a specialized application, or other appropriate technique. Additionally, the consumer may access the login and payment facilities of payment provider 208 through a web browser (as in the example below), a specialized application, or other appropriate technique.

In the example of FIG. 6, the device 204 communicates over network 210 with merchant 202 using any appropriate e-commerce tools. When the transaction progresses to the point that the consumer is ready to pay for the items, the consumer presents the merchant's account credentials to payment provider 208, rather than presenting consumer account credentials. To this end, merchant 202 may make its credentials available to the consumer using any appropriate technique. For instance, merchant 202 may generate an alphanumeric string that identifies the transaction, the amount, and the account credentials and display such information within the e-commerce interface accessed by the consumer.

The consumer's electronic device may present the merchant's account credentials to payment processor 208 in any appropriate manner. In one example, the consumer copies the alphanumeric string and then pastes the alphanumeric string into a separate web page associated with payment processor 208. In another example, the merchant may provide within its e-commerce interface a hyperlink to the webpage associated with payment processor 208, and when the consumer selects the link, the alphanumeric string is placed in a web "cookie" that is sent by the consumer's browser to a server associated with payment processor 208. The consumer then logs into her account with payment processor 208 using the website associated with payment processor 208, enters information and/or confirms that the entered information is correct, and then instructs payment processor 208 to effect the fund transfer to make the payment.

After payment processor 208 confirms the transaction and/or schedules payment, payment processor 208 then sends a confirmation message to merchant 202 and device 204. Merchant 202 may then refresh its e-commerce interface presented to device 204 to indicate that the transaction is complete.

The examples of FIGS. 5 and 6 are examples, and it is understood that any technique for pushing payment from a consumer to a merchant is within the scope of embodiments. In other words, the examples above describe a POS scenario and an online scenario, though various embodiments may be adapted for any sales paradigm now known or later developed.

For instance, a further example includes a consumer paying for an item at a brick and mortar store using a smart phone with Internet access. In this example embodiment, the consumer checks out and receives a Push Payment card from the merchant. The smart phone scans an indicia on the Push Payment card to extract the merchant's FPS information. The Push Payment card may have a magnetic strip, similar to a credit card, which is read by a reader on the mobile device. An example of one reader is the PayPal Here™ module which is a credit card reader. The Push Payment card may have another indicia, such as a bar code, QR code, and so forth. Processing from extraction of the merchant's credentials, or FPS information, may take a variety of forms.

Using Push Payments the merchant does not require a credit card reader or the capability to receive the consumer's credit or financial information. The merchant's POS does not need to have capability to communicate with a variety of financial service providers, but is able to communicate with a single provider, their own. The merchant's POS may have capability to accept credit card payments, on-line payments, and/or Push Payments, providing a variety of resources to the merchant. Note, this capability is particularly applicable to small to medium sized businesses, as the cost of infrastructure is often prohibitive, limiting the size of the business as well as limiting the payment solutions they are able to support. Using Push Payments, the consumer may use credit, debit, on-line, digital wallet, or other forms of payment for a transaction/purchase independent of whether the merchant accepts all the specific payment type. When the merchant accepts push payments, then the consumer may push from the financial payment provider and source of their choice, while the merchant receives from their own FSP.

The consumer's mobile device may store information about a merchant, such as to store the FPS info in a cookie or secure memory to facilitate easy, quick processing when purchasing from this merchant. In this case, when the consumer enters the store, the push payment module identifies the store and is prepared for the transaction. Still further, the mobile device will recognize when a purchase is selected on the mobile device, such as web store purchase, and prepares the stored information for the transaction. In one example, when the consumer indicates the purchase to the merchant and message or code is sent to the merchant indicating that the consumer already has the merchant information. The merchant may reduce the information exchanged with the consumer, as the consumer already has some of the information.

In some embodiments the merchant's FPS information is stored by a service that maps an identifier to the FPS information. In this way, requests for the FPS information may be analyzed for fraud. In such a scenario, the consumer's mobile device receives a code from the merchant; the mobile device sends a request for the FPS information to the service which responds with the merchant FPS information. The mobile device is then able to initiate the push payment to the merchant FPS.

In a further example a consumer desires to pay for an item at a brick and mortar store using a basic feature phone that does not support Internet access. In this example embodiment, the consumer checks out at the POS, where the POS generates a string that identifies the transaction, the transaction amount, and the merchant's account credentials. The consumer then enters the string in, e.g., a Short Message Service (SMS) application and sends the string via SMS to its payment provider. The payment provider then schedules payment and sends a confirmation message to the merchant and the consumer using SMS or other technique.

Figure 7:
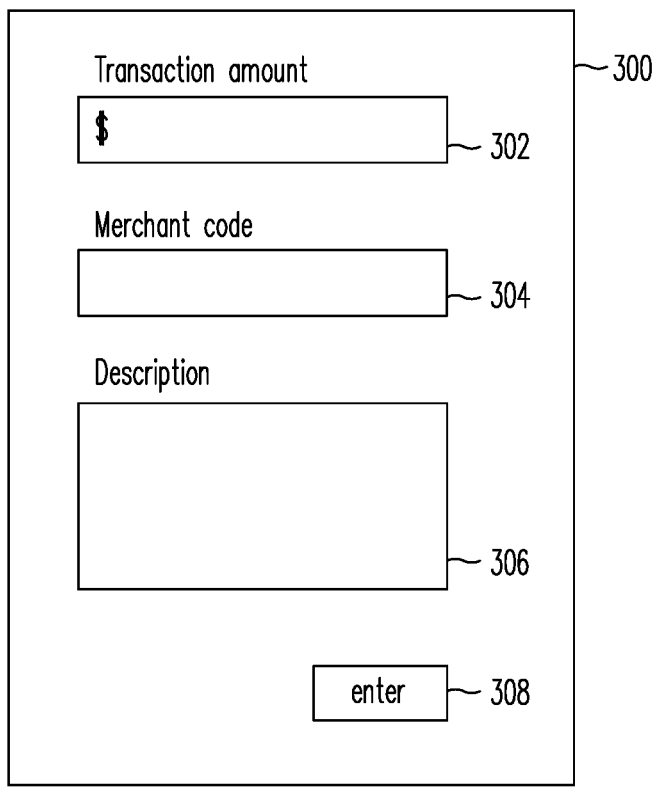
FIGS. 7-10 illustrate example user interfaces displayed upon a display screen according to various aspects of the present disclosure.

FIG. 7 is an illustration of an example interface 300 presented on a mobile device of a consumer in accordance with the embodiment of FIG. 5. Interface 300 may be presented on a touch-screen device or other device associated with the consumer (e.g., mobile device 104 of FIG. 5). The consumer interacts with interface 300 to process the transaction. Interface 300 may be displayed via a web browser, dedicated application, or other tool.

Field 302 allows for the entry of a transaction amount. In some embodiments, the consumer may enter the amount manually, though in other embodiments, an application on the consumer's device may automatically enter the transaction amount. For instance, the user may scan, optically or otherwise, a label on an item, and a scanning application may then use the scanned data to access a database of products and prices and then fill in field 302. Similarly, a POS of the merchant may scan the item and then communicate with the consumer's device wirelessly or otherwise to provide the amount to the mobile application. When the consumer has selected push payment processing, the POS will send the FSP information to the consumer's electronic device; such information is received by the electronic device and processed. The electronic device may display an indication that a push payment is being processed for the current transaction.

Field 304 allows for entry of the merchant's account credentials. Field 304 may be filled in manually or automatically. In one example, the merchant provides its indicia as described above with respect to FIG. 5 in a manner that is machine-readable and/or human-readable. In some embodiments this information is not visible to the user but may be read and processed by the electronic devices, such as when a message has been sent to the mobile device or when the mobile device scans a push payment code of the merchant. The information may be dynamically generated at checkout or time of purchase. The dynamic information may change a private key encrypting the information, or may change the merchant's account number randomly or on a periodic basis to prevent fraud. In some embodiments, the merchant code is information to process the transaction, and may be a unique code for the merchant which is mapped to the corresponding account information for the merchant.

The consumer and/or application may enter information in field 306 to further identify the transaction. For instance, the merchant may provide a transaction identifier so that when payment is received it is clear which transaction is associated with the payment. Such information may be entered manually or automatically (e.g., by the mobile application communicating with the POS). The consumer may also add her own notes, as appropriate. By pressing enter button 308, the consumer causes the application to send the merchant's information and other information to the payment provider for payment.

Figure 8:
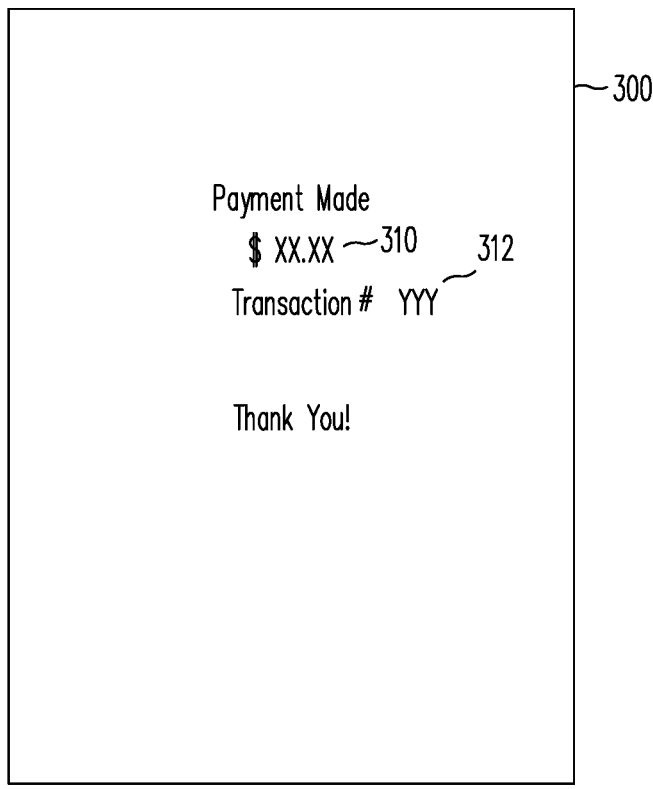

FIG. 8 also illustrates example interface 300, but with a different screen appropriate for displaying a confirmation message. The screen of FIG. 8 in this example displays a message from the payment provider to the consumer to indicate that the payment of FIG. 7 has been scheduled. For convenience of the consumer, the screen also includes the amount of the transaction and the transaction identifier.

In some embodiments, the merchant will also receive a confirmation message from the payment provider or from its own funding source or bank. In such a scenario, the merchant may view a same or similar message on a sales machine, such as a POS or computer. Upon confirmation, the merchant understands that payment is forthcoming and that the transaction is complete.

In some embodiments communications between the transmitter and receiver devices is in the form of dynamic codes that are scanned by each device. For example, the dynamic codes may be bar codes displayed on the devices and scanned by the other devices.

Figure 9:
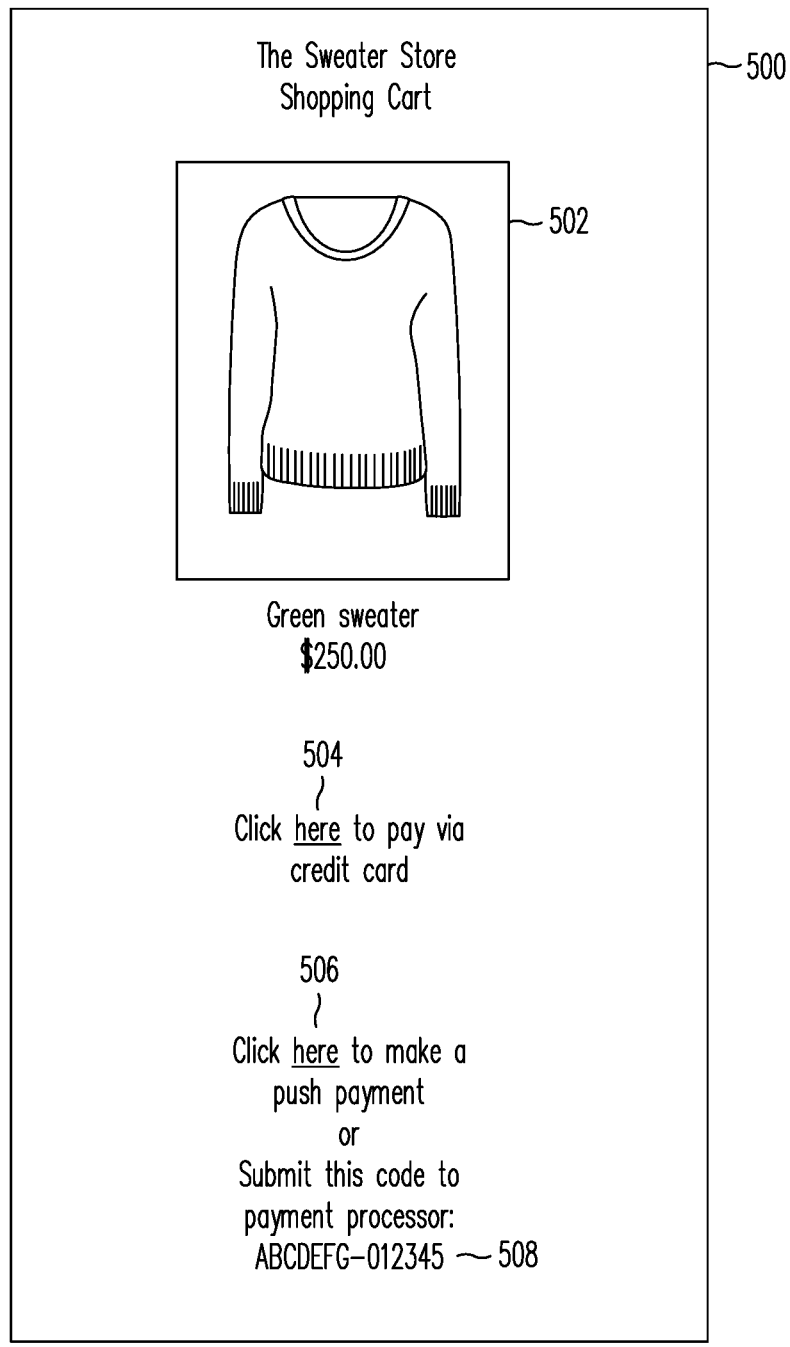

FIG. 9 is an illustration of example interface 500, adapted according to the online transaction embodiment of FIG. 6. The interface 500 may be presented on a mobile computing device or non-mobile computing device, and it may be presented to a consumer by a merchant as the consumer finishes an online transaction.

FIG. 9 shows a shopping cart, where the consumer has selected a $250 green sweater and now desires to make payment and complete the transaction. Interface 500 shows thumbnail 502 of the sweater and presents two options 504, 506 for payment. The first option 504 is a link that takes the consumer to a conventional credit card payment, where the consumer submits her credit card information to the merchant. By contrast, the second option 506 is a link that, when selected, takes the consumer to a payment provider, such as PayPal™. The selection of a a Push Payment initiates communication with the merchant's POS device and receipt of the merchant's FSP information.

The consumer may also select have an option to let a digital wallet suggest a payment source. The digital wallet may be programmed to rank sources based on available credit, balances, and other criteria. The consumer may set a scenario for selection, or may set an order of sources, such as to use my first credit card unless there is no credit left, then use my second credit card. The consumer may select to use an on-line payment processor, such as PayPal, which will provide the funds for the transaction and allow the consumer time to make a selection as to how to fund the transaction.

To ensure the payment, in some embodiments the merchant's electronic device may save the consumer's phone number or other ID until the payment is complete. The merchant's FSP may store information from the consumer's payment processor until the transaction is complete.

In some instances, the merchant creates a web cookie with the transaction information and the merchant's account credentials and passes the web cookie to the browser or application running on the consumer's device. When the consumer selects the link 506, the consumer's browser or other application takes the consumer to the payment provider and also passes the web cookie to the payment provider's web servers. The payment provider's web servers then automatically populate a screen for the consumer, as shown in FIG. 10.

Figure 10:
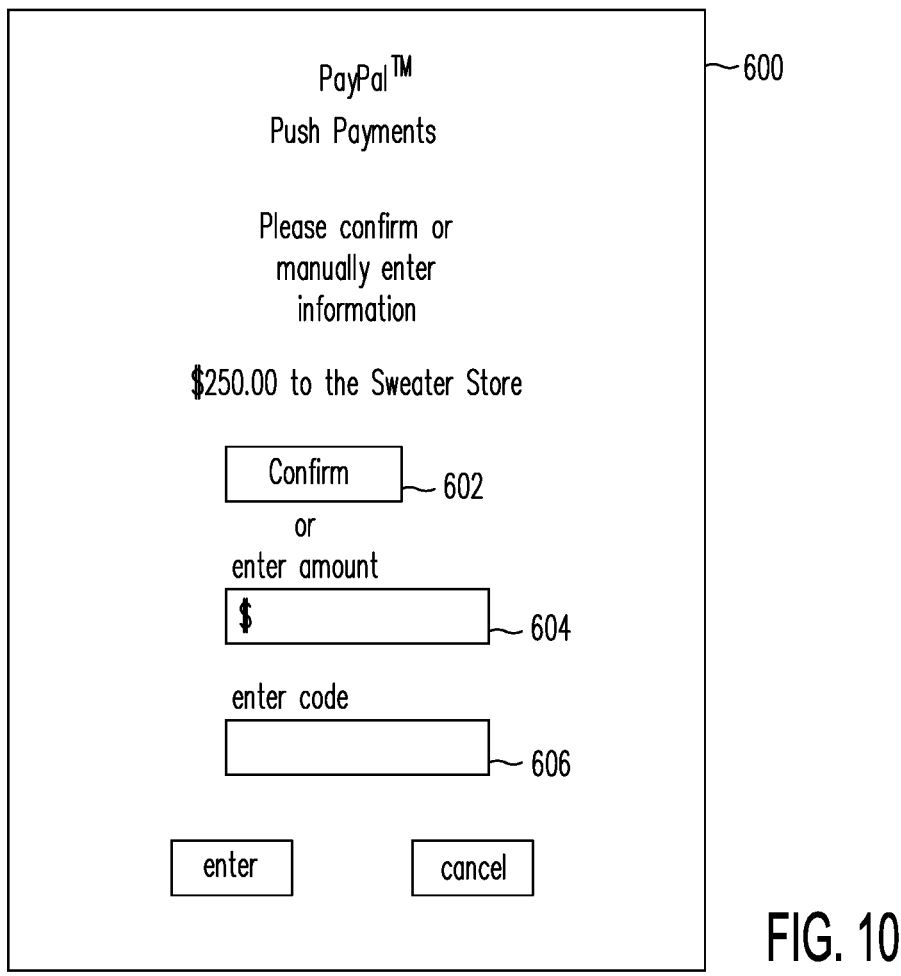

FIG. 10 is an illustration of example interface 600, adapted according to the online transaction embodiment of FIG. 6. The interface 600 may be presented on a mobile computing device or non-mobile computing device, and it may be presented to the consumer by the payment provider as the consumer pays for an online transaction.

FIG. 10 assumes that the consumer has selected link 506 of FIG. 9 and also that the consumer's web browser or other application has taken the consumer to a tool of the payment provider in response to selecting the link 506. As shown in FIG. 10, the payment provider has used the web cookie to display that the payment provider is ready to send $250 to the merchant upon confirmation by the consumer. The consumer may confirm and allow the payment by selecting button 602. Alternatively, the consumer may manually enter the amount in field 604 and enter code 508 (FIG. 9) in field 606 to effect payment. In some embodiments, the merchant may not provide a web cookie or other mechanism for the payment provider to automatically be aware of the transaction amount and payee. Such embodiments may fall back on manual entry, as in fields 604 and 606 or may use another appropriate technique.

The payment provider then schedules payment to the merchant's account and sends a confirmation message to the merchant and to the consumer. For instance, the payment provider may send a message that appears to the consumer on either or both of interfaces 500, 600 the same as or similar to the message of FIG. 8. In some instances, the merchant may present a "payment complete" message to the consumer on interface 500 upon receiving a payment confirmation from the payment provider.

FIGS. 7-10 are shown as an illustrative example, and other embodiments may provide different screens or different fields in order to facilitate a push payment. The scope of the disclosure provides for any appropriate interface that allows for presentation of a merchant's account credentials and other information to a consumer's payment provider.

Figure 11:
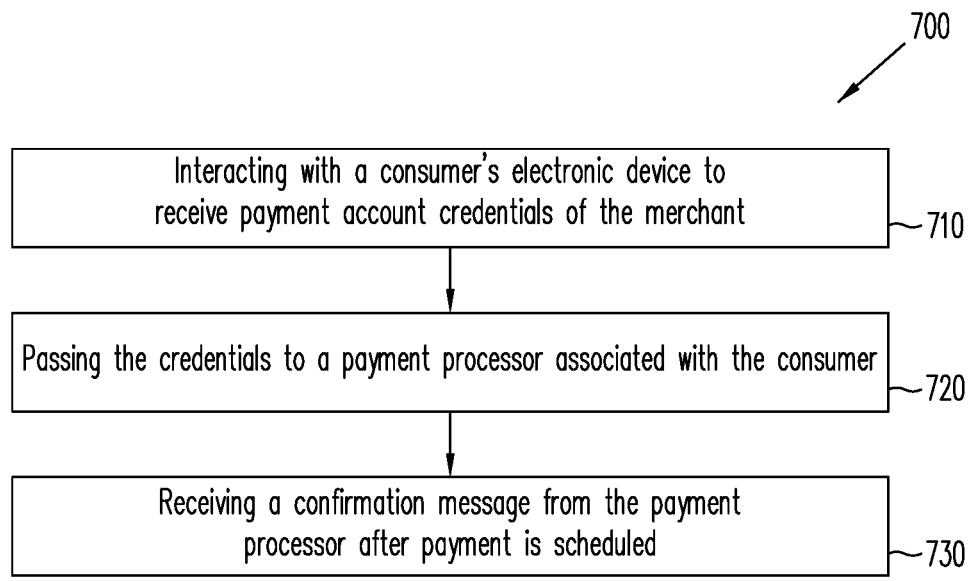
FIGS. 11 and 12 illustrate example methods to make payment at a POS and manage proxy accounts at a mobile device.

Various embodiments include methods for making payment for a transaction by pushing payment from a consumer to a merchant's account. FIG. 11 illustrates example method 700, adapted according to one embodiment, for making push payments according to the principles discussed above in FIGS. 2-10. The example of FIG. 11 is from the perspective of the consumer, and the actions of FIG. 11 may be performed by one or more processing devices, such a mobile or non-mobile computing device associated with the merchant. The one or more processing devices may execute code that provides a specialized application or other tool. The messaging between a POS device and a consumer's mobile device may include prompts from one device to the other.

At block 710, the processing device of the merchant interacts with the consumer's electronic device to provide payment account credentials of the merchant. In one example, the consumer may manually enter the account credentials or may cause the consumer's electronic device to read indicia that provides the merchant's credentials. When interacting with the consumer's electronic device, the merchant's processing device may use a user interface, such as that described above at FIGS. 7, 8, and 10. In some embodiments the credentials are presented to the consumer's electronic device by communications, and in other embodiments, the credentials are communicated by way of printed or displayed indicia which is scanned or read by the consumer's electronic device.

In one embodiment, the consumer's electronic device reads a merchant push payment indicia which provides the FSP information. The indicia may be on a card, similar to a credit card, or may be on a sticker attached to a POS device, or may be presented on a display screen of a POS device. In another embodiment, the consumer's electronic device sends a message to the merchant POS requesting a push payment transaction. When the POS is capable of processing push payment transactions the POS responds and provides the FPS information, or indication thereof.

At block 720, the merchant's processing device passes the credentials to a payment provider associated with the consumer, such as a TFS. For instance, the merchant's processing device may pass the merchant's account credentials via the Internet, a cellular network, and/or other network. Examples of payment providers may include any entity with a payment facility, such as a bank or payment service, such as PayPal Inc. The consumer's electronic device may pass the merchant's account credentials to the TFS via the Internet, a cellular network, or other network.

At block 730, the merchant's processing device receives a confirmation message from the consumer's payment provider indicating the payment is scheduled. As used in this example, a payment may be scheduled by funds transfer or confirming that a payment is set to be made at some time in the future. Confirmation of payment may be sent to the merchant's processing device from the merchant's FSP.

The scope of embodiments is not limited to the particular flow shown in FIG. 11. Rather, other embodiments may add, omit, rearrange, or modify one or more actions in accordance with a given design. For instance, other embodiments may have more or less interaction with the consumer or more or less interaction with the merchant. Any appropriate division of responsibility between the merchant and the consumer is within the scope of embodiments as long as the consumer presents the merchant's credentials to the payment provider either directly or indirectly. As mentioned above, various embodiments are not limited to any transaction paradigm, but rather may be used with online transactions, transactions at a merchant's POS, or transactions elsewhere.

Figure 12:
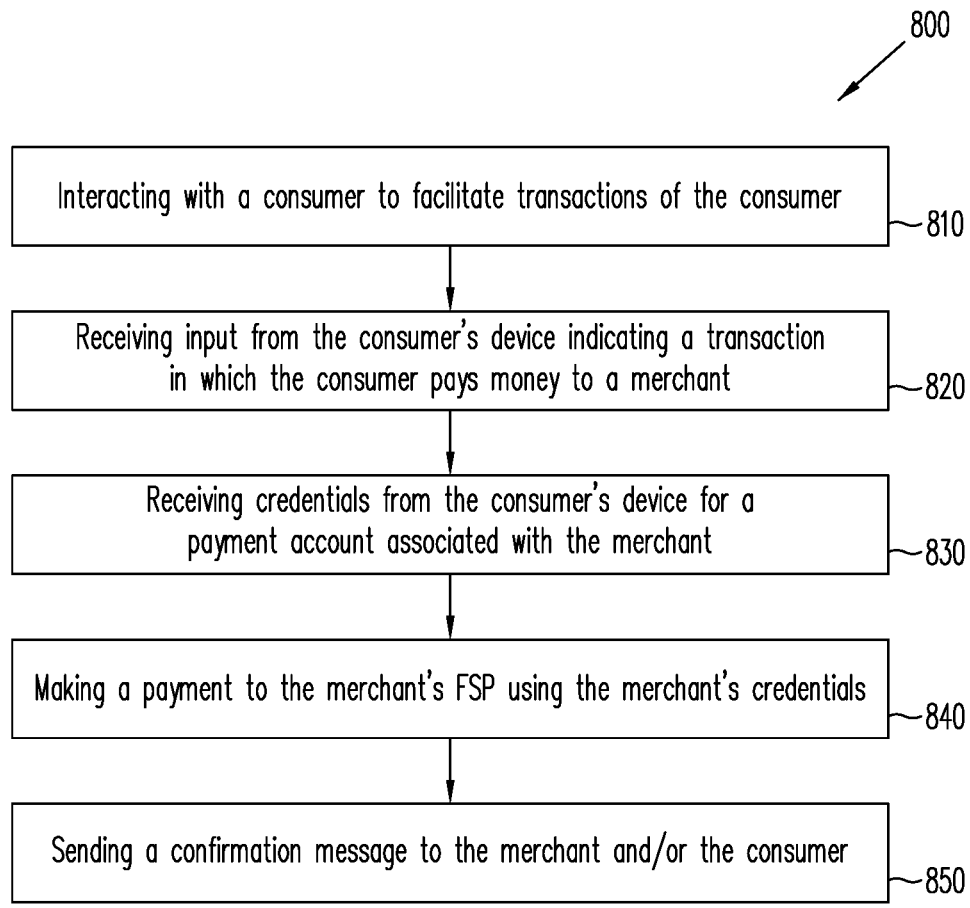

FIG. 12 is an illustration of example method 800, adapted according to one embodiment, to manage push payments. The actions of FIG. 12 may involve one or more of a variety of electronic payment providers (e.g., an entity providing an electronic payment, such as PayPal™, an issuing bank for a credit card or debit card, and/or the like). In some embodiments, the various actions are carried out by one or more computer processors executing computer code to provide the described functionality. For instance, the actions may be performed by one or more server computers that are associated with a push payment service. The push payment service is provided by a server or other computing device that communicates with multiple devices via networked communication means, such as Internet, cellular or other networked communications.

In block 810, the push payment service interacts with the transmitter electronic device to facilitate transactions of the transmitter with a receiver device, such as a POS device. In some embodiments, the POS device is a computing device having capability to process payments and perform financial transactions, such as an notebook computing device with such capability in hardware, software and/or firmware. For instance, the service may provide the interfaces shown in FIGS. 7, 8, and 10 (e.g., in the case of web-based online shopping) or may interact with an application (e.g., in the case of a mobile application). Various embodiments may provide any level of interaction with the consumer.

In block 820, the push payment service receives input from the consumer device indicating a transaction in which the consumer pays money to the merchant. For instance, the consumer's computer or electronic device may send an explicit message to the push payment service requesting that push payment be made for a certain transaction. Alternatively, the consumer's computer device may make the indication implicit by requesting a push payment service. Furthermore, block 820 may include sending other types of information as well, such as a transaction identifier, a transaction amount, and/or any other appropriate information that may be used in completing the transaction.

In block 830, the consumer's payment provider receives the merchant's credentials from the consumer device for a payment account associated with the merchant. As mentioned above, the merchant's credentials may include any information that may be used to identify, either directly or indirectly, a merchant account. Examples of credentials include account numbers, security codes, identifications and passwords, telephone numbers, network addresses, and/or the like. This information may use the ACH type information that is used in other conventional transactions.

In block 840, the consumer's payment provider makes a payment to the merchant's FSP using the merchant's credentials. For purposes of this example, making a payment may include effecting the actual transfer of money as well as ensuring that the transfer is made at a set time in the future. In other words, block 840 is not limited to making immediate payment and may instead include starting a process that is expected to eventually provide payment to the merchant at some time in the future.

Block 840 may further include verifying that the consumer has sufficient funds to cover the payment and/or is in compliance with a credit agreement. If the consumer does have sufficient funds or is not in compliance with the credit agreement, the consumer's payment provider may deny the payment; otherwise, the consumer's payment provider may make the payment. In some instances, the consumer's payment provider may provide for setting aside some funds or some credit for push payments beforehand so that push payments may be verified quickly. In some embodiments the consumer's payment provider, such as a TFS, provides a Push Payment account wherein monies are allocated for these type payments.

In block 850, the consumer's payment provider sends a confirmation message to the merchant and/or the consumer device(s) to indicate that payment is made successfully at block 840.

The scope of embodiments is not limited to the particular flow shown in FIG. 12. Rather, other embodiments may add, omit, rearrange, or modify one or more actions in accordance with a given design. For instance, method 800 may include interacting with multiple consumers and merchants as part of a large payment operation. The push payment service manages the push payment, including determining if the merchant and consumer devices are configured to process push payments, providing messaging between the merchant and consumer devices, verifying payments, managing communications among the various entities to process a push payment. The push payment service may also provide software downloads for apps, such as a mobile app to enable push payments or a module to extend the functionality of a POS device to accept push payments.

Figure 13:
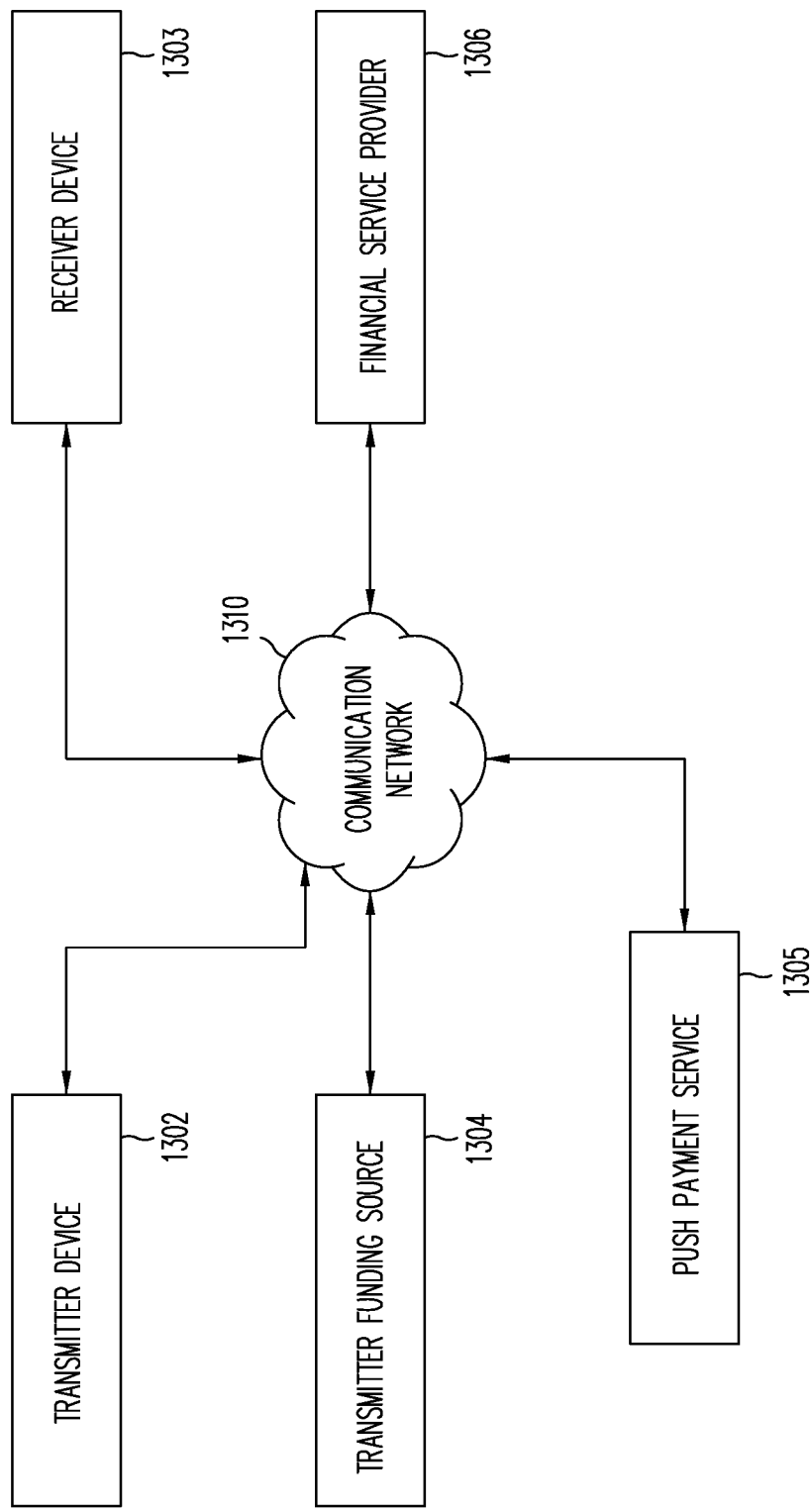
FIG. 13 is an illustration of an example relationship among the various components mentioned in the descriptions of FIGS. 11 and 12.

FIG. 13 is an illustration of example relationship among the various components mentioned in the descriptions of FIGS. 11 and 12. In this example, transmitter device 1302 corresponds to the consumer's electronic device (e.g., such as a smartphone, laptop, tablet computer, etc.). Receiver device 1303 corresponds to various computing resources associated with the payee or merchant (e.g., a POS or server computer). FSP 1306 is an electronic system(s) that maintains the receiver's financial account, and includes an electronic system for communicating with electronic systems used by other financial service providers, and TSP 1304 is an electronic system(s) that maintains accounts for users and has capability for communication with electronic systems used by other funding sources and financial service providers. Push payment service 1305 is a capability associated with TFS 1304, whereby TFS provides push payments, as described above in the preceding examples. The various components 1302-1306 communicate with each other over communication network 1310, which may include one or more networks, such as a cellular network, the Internet, and the like.

Figure 14:
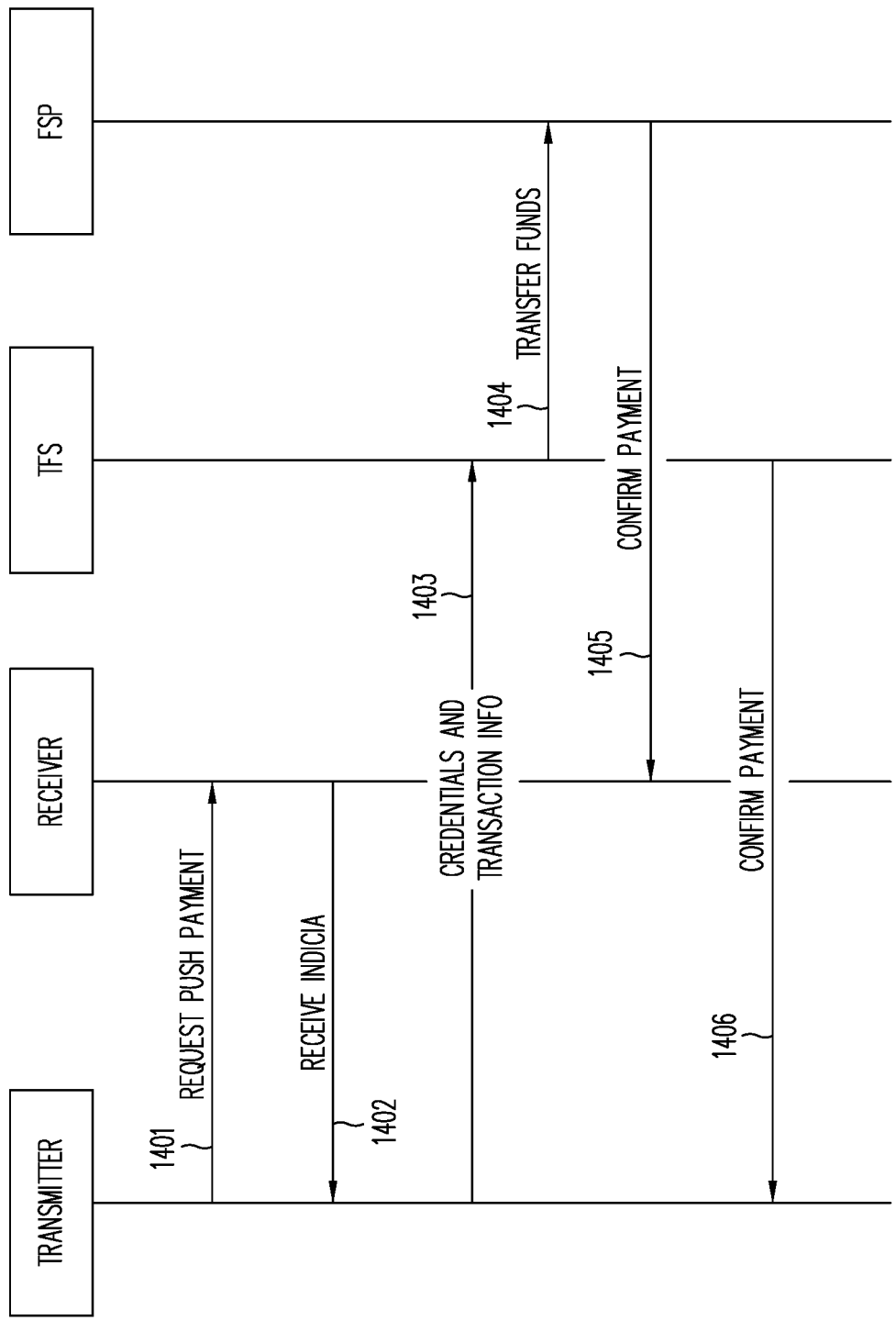
FIG. 14 is a signal diagram of communications that may be carried out in the configuration of FIG. 13

FIG. 14 is a signal diagram of communications that may be carried out in the configuration of FIG. 13. The signals of FIG. 14 may be provided in any appropriate manner, including wired or wireless, over any network or combination of networks, and may be formed according to appropriate messaging format. At action 1401, the transmitter requests a push payment from the receiver, e.g., to initiate a transaction. At action 1402, the transmitter receives indicia that provides the receiver's account credentials. Examples of receiving indicia are provided in more detail above.

At action 1403, the transmitter provides the receiver's credentials and transaction information to the TFS. In an alternative scenario, the receiver may send its credentials to directly the TFS, rather than through the transmitter. Examples of providing the receiver's credentials and transaction information (as well as other information) are provided in more detail above. At action 1404, the TFS transfers the funds to the FSP to cover the transaction.

Further in this example, the FSP confirms payment to the receiver, and TFS confirms payment to the transmitter. However, in other scenarios, the FSP may confirm payment to both the transmitter and the receiver. Examples of sending confirmation messages are provided in more detail above.

Various embodiments may provide one or more advantages over conventional techniques. For instance, conventional techniques include the consumer providing her account credentials to the merchant, thereby exposing the consumer to risk of fraud. By contrast, various embodiments include the merchant exposing its account credentials, thereby lessening the risk for the consumer. Exposure of the merchant's credentials may be risk-limited by using an account for the merchant that is highly restrictive as to withdrawals.

Figure 15:
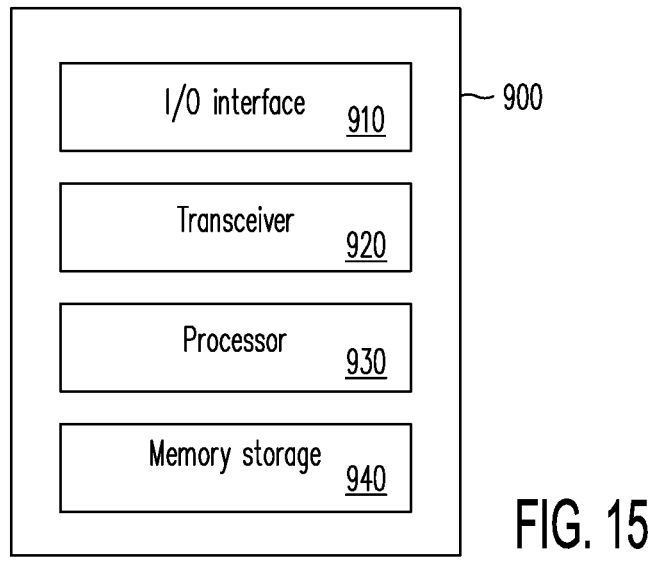
FIGS. 15 and 16 illustrate a block diagrams of computer systems for implementing various methods and devices described according to various aspects of the present disclosure.

FIG. 15 is a simplified block diagram of an example electronic device 900 on which a consumer may interact with a POS, a merchant website, and/or the payment provider according to various aspects of the present disclosure. The electronic device 900 may be a portable personal electronic device, such as a smart phone, laptop, or a tablet. The electronic device 900 may also be a more powerful computer, for example a server computer. The electronic device 900 includes an input/output interface 910. The interface 910 is operable to receive an input from a user and communicate an output to the user. In an embodiment, the input/output interface 910 includes a visual display unit, for example a touch-sensitive screen. Input/output interface 910 may display a graphical interface, such as interfaces 300, 500, and 600 of FIGS. 7-10.

The electronic device 900 includes a transceiver 920. The transceiver 920 is operable to electronically communicate with external devices. In an embodiment, the transceiver 920 is operable to wirelessly communicate with a POS, cellular towers, or other network access points and infrastructure. The electronic device 900 also includes a computer processor 930 that is operable to execute computer instructions and a memory storage 940 that is operable to store the computer instructions.

The memory storage 940 also contains a program module that is an embodiment of the application that interacts with the POS, the merchant's website, and/or the payment provider. The program module operates to provide action such as receiving merchant account credentials and passing the credentials to the payment provider.

Figure 16:
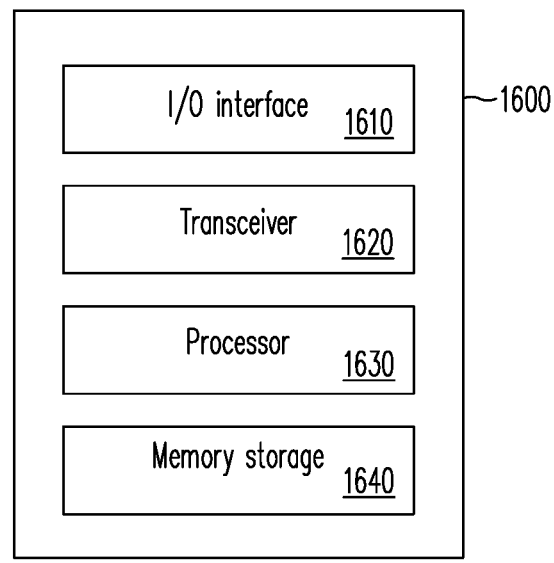

FIG. 16 is a simplified block diagram of an example electronic device 1600 embodied as a POS according to various aspects of the present disclosure. The electronic device 1600 may be a portable personal electronic device, such as a smart phone, laptop, or a tablet. The electronic device 1600 may also be a more powerful computer, for example a server computer. In other embodiments, a POS is a system that includes one or more interface terminals communicating with a computer system over a network. The electronic device 1600 includes an input/output interface 1610. The interface 1610 is operable to receive an input from a user (e.g., an employee at a merchant's store) and communicate an output to the user. In an embodiment, the input/output interface 1610 includes a visual display unit, for example a touch-sensitive screen on which a user may enter items to be purchased, scan items to be purchased, initiate a transaction, process a refund, and request/receive payment confirmation, and/or the like.

The electronic device 1600 includes a transceiver 1620. The transceiver 1620 is operable to electronically communicate with external devices. In an embodiment, the transceiver 1620 is operable to wirelessly communicate with a consumer's electronic device, cellular towers, or other network access points and infrastructure. The electronic device 1600 also includes a computer processor 1630 that is operable to execute computer instructions and a memory storage 1640 that is operable to store the computer instructions.

The memory storage 1640 also contains a program module that is an embodiment of the application that interacts with the consumer's electronic device, a human user, and/or the payment provider. The program module operates to provide action such as providing merchant account credentials and receiving payment confirmations.

Figure 17:
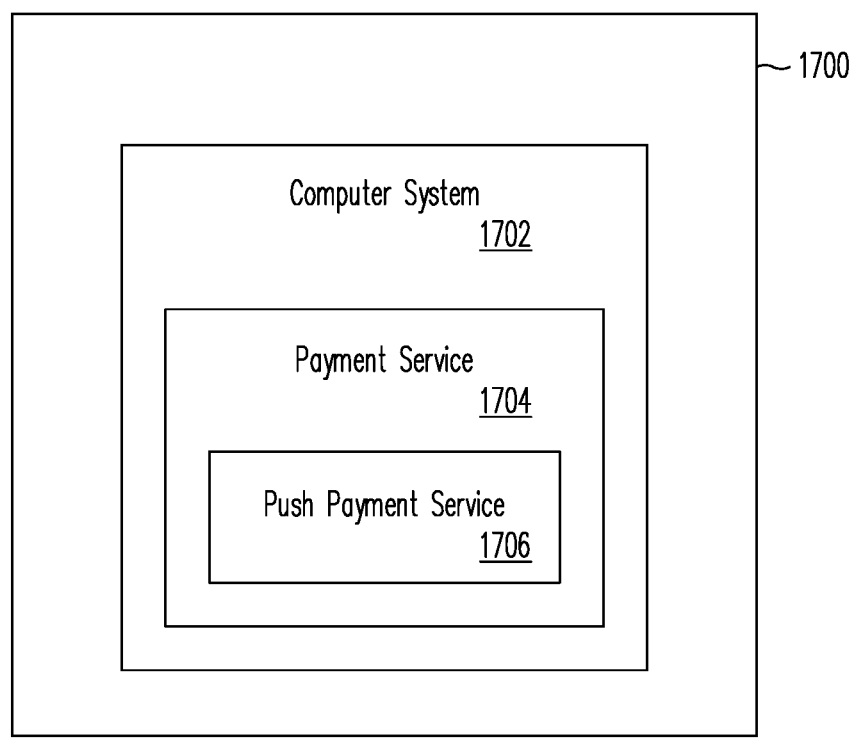
FIG. 17 is a simplified block diagram of an example transmitter funding source according to various aspects of the present disclosure

FIG. 17 is a simplified block diagram of an example transmitter funding source 1700 according to various aspects of the present disclosure. The transmitter funding source, as explained above may be an organization that processes payments on behalf of the payor. Examples of transmitter funding sources include banks and other payment processors.

Transmitter funding source 1700 includes computer system 1702, which may be configured according to the example of FIG. 18 (described below), where one or more such computers may be programmed to receive payment instructions and to process payments accordingly. Computer system 1702 has processors that execute computer-readable code to provide the functionality of payment service program 1704. Payment service program 1704 includes functionality to make payments, both according to conventional techniques and according to the push-payment examples described above. For instance, payment service program 1704 includes push payment service program 1706, which receives payee credentials and then makes a payment for the payor to the payee, sc described in more detail above.

Figure 18:
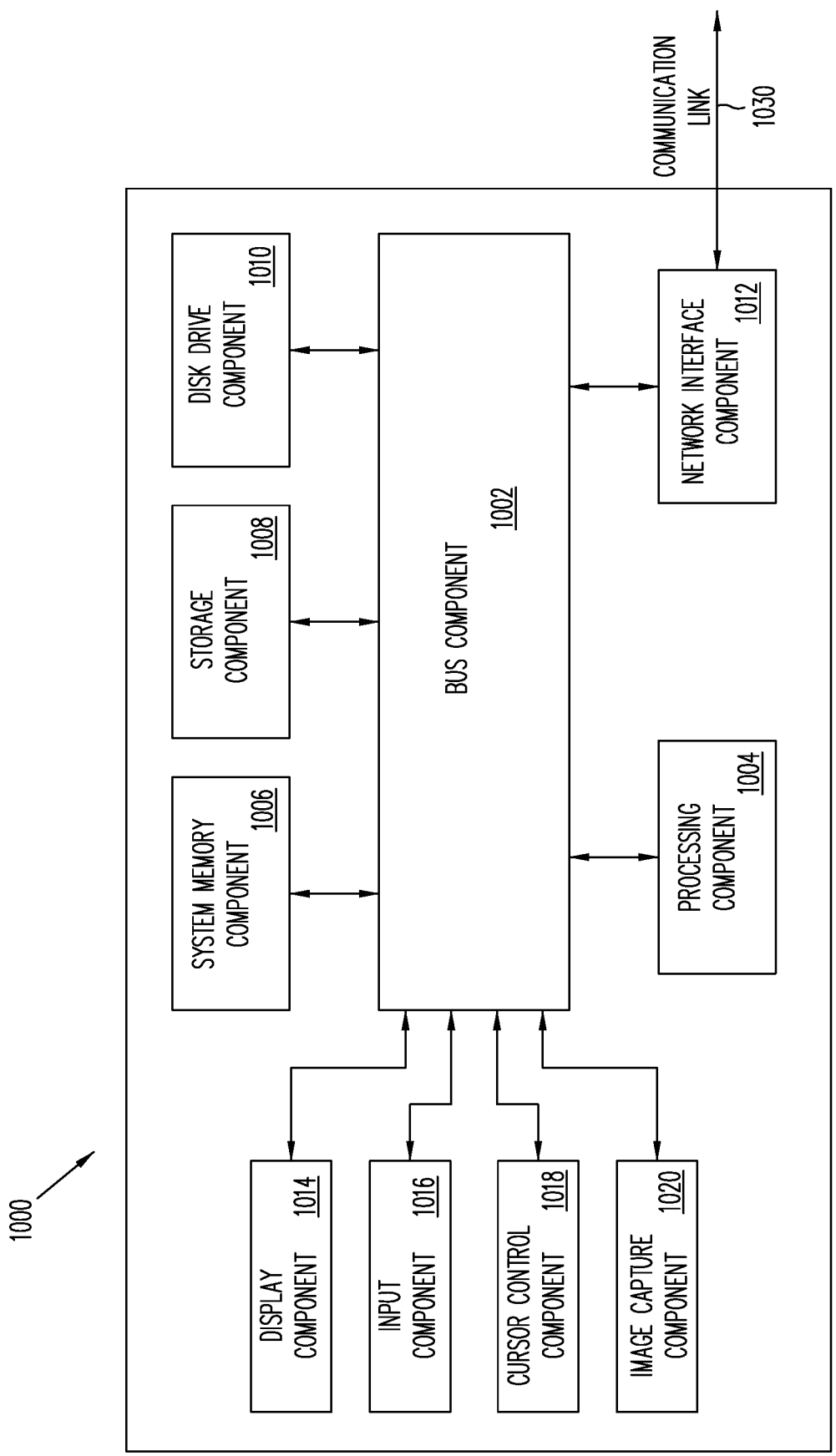
FIG. 18 illustrates a block diagram of a computer system for implementing various methods and devices described according to various aspects of the present disclosure.

FIG. 18 is a block diagram of a computer system 1000 suitable for implementing various methods and devices described herein, for example, the various method blocks of the methods 700, 800. For example, the computer system 1000 may represent a computer upon which the consumer sees interfaces 300, 500, and 600. In another example, the computer system 1000 may represent a server computer or other type of computer that can be used as part of an account management or payment processing infrastructure at a payment provider (e.g., an FSP or a TFS) or may be implemented by a merchant. Accordingly, it should be appreciated that each of the devices may be implemented as the computer system 1000 for communication with a network in a manner as follows.

In accordance with various embodiments of the present disclosure, the computer system 1000, such as a mobile communications device and/or a network server, includes a bus component 1002 or other communication mechanisms for communicating information, which interconnects subsystems and components, such as processing component 1004 (e.g., processor, micro-controller, digital signal processor (DSP), etc.), system memory component 1006 (e.g., RAM), static storage component 1008 (e.g., ROM), disk drive component 1010 (e.g., magnetic or optical), network interface component 1012 (e.g., modem or Ethernet card), display component 1014 (e.g., touch-screens, cathode ray tube (CRT) displays, or liquid crystal display (LCD)), input component 1016 (e.g., keyboard or touch-sensitive components operable to detect a touch by a human body), cursor control component 1018 (e.g., mouse or trackball), and image capture component 1020 (e.g., analog or digital camera). In one implementation, disk drive component 1010 may comprise a database having one or more disk drive components.

In accordance with embodiments of the present disclosure, computer system 1000 performs specific operations by processor 1004 executing one or more sequences of one or more instructions contained in system memory component 1006. Such instructions may be read into system memory component 1006 from another computer readable medium, such as static storage component 1008 or disk drive component 1010. In other embodiments, hard-wired circuitry may be used in place of (or in combination with) software instructions to implement the present disclosure.

Logic may be encoded in a computer readable, non-transitory medium, which may refer to any medium that participates in providing instructions to processor 1004 for execution. Such a medium may take many forms, including but not limited to, non-volatile media and volatile media. In various implementations, non-volatile media includes optical or magnetic disks, such as disk drive component 1010, and volatile media includes dynamic memory, such as system memory component 1006.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 1000. In various other embodiments of the present disclosure, a plurality of computer systems 1000 coupled by communication link 1030 (e.g., a communications network, such as a LAN, WLAN, PTSN, and/or various other wired or wireless networks, including telecommunications, mobile, and cellular phone networks) may perform instruction sequences to practice the present disclosure in coordination with one another.

Computer system 1000 may transmit and receive messages, data, information and instructions, including one or more programs (i.e., application code) through communication link 1030 and communication interface 1012. Received program code may be executed by processor 1004 as received and/or stored in disk drive component 1010 or some other storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as computer program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

It should be appreciated that like reference numerals are used to identify like elements illustrated in one or more of the figures, wherein these labeled figures are for purposes of illustrating embodiments of the present disclosure and not for purposes of limiting the same.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
   a non-transitory memory; and
   one or more hardware processors coupled to the non-transitory memory and configured to read instructions from the non-transitory memory to cause the system to perform operations comprising:
   receiving, via a user device of a user, a request for processing a payment transaction between the user and a merchant;
   in response to receiving the request, causing the user device of the user to (i) capture an image representing an identifier of a financial service provider account associated with the merchant and (ii) initiate a communication with a merchant device associated with the merchant;
   obtaining, from the merchant device and based on the communication, transaction information associated with the payment transaction, wherein the transaction information comprises a device identifier of the merchant device, a transaction identification number associated with the payment transaction, and an amount associated with the payment transaction;
   extracting the identifier of the financial service provider account from the image;
   instructing a payment provider computer system to push funds, for the payment transaction, from a funding source of the user to the financial service provider account associated with the merchant based on the identifier and the amount; and
   in response to obtaining an indication that the payment transaction has been processed from the payment provider computer system, transmitting a confirmation message to the merchant device based on the device identifier, wherein the confirmation message comprises the indication and the transaction identification number.

2. The system of claim 1, wherein the operations further comprise:
   authenticating the user of the user device for accessing the funding source based on user credentials received via the user device, wherein the user credentials include one of a password, a security code, or biometric data of the user.

3. The system of claim 1, wherein the financial service provider account associated with the merchant is a deposit-only account.

4. The system of claim 1, wherein the communication is conducted between the user device and the merchant device via one of a Wi-Fi connection or a Near Field Communication (NFC) connection.

5. The system of claim 1, wherein the operations further comprise:
   receiving merchant credentials for the financial service provider account; and
   transmitting the merchant credentials to the payment provider computer system.

6. The system of claim 1, wherein the image comprises a code.

7. The system of claim 1, wherein the merchant device is a point-of-sale device associated with the merchant, and wherein the request is received from the point-of-sale device associated with the merchant.

8. A method comprising:
   receiving, by one or more hardware processors and via a user device of a user, a request for processing a payment transaction between the user and a merchant;
   in response to receiving the request, causing, by the one or more hardware processors, the user device of the user to (i) capture an image and (ii) initiate a communication with a merchant device associated with the merchant;
   extracting, by the one or more hardware processors and from the image, an identifier of a financial service provider account associated with the merchant;
   obtaining, via the user device and based on the communication, transaction information associated with the payment transaction, wherein the transaction information comprises a device identity of the merchant device, a transaction identification number associated with the payment transaction, and an amount associated with the payment transaction;
   causing, by the one or more hardware processors, a payment provider computer system to push funds, for the payment transaction, from a funding source of the user to the financial service provider account of the merchant based on the identifier and the amount; and
   in response to obtaining an indication that the payment transaction has been processed from the payment provider computer system, transmitting a confirmation message to the merchant device based on the device identity, wherein the confirmation message comprises the indication and the transaction identification number.

9. The method of claim 8, further comprising:
   receiving user credentials from the user device, wherein the user credentials include one of a password, a security code, biometric data of the user; and
   authenticating the user of the user device for accessing the funding source based on the user credentials.

10. The method of claim 8, wherein the financial service provider account associated with the merchant is a deposit-only account.

11. The method of claim 8, wherein communication is conducted between the user device and the merchant device via one of a Wi-Fi connection or a Near Field Communication (NFC) connection.

12. The method of claim 8, further comprising:
    receiving merchant credentials for the financial service provider account; and
    transmitting the merchant credentials to the payment provider computer system.

13. The method of claim 8, wherein the image comprises a code.

14. The method of claim 8, wherein the request is received from the merchant device associated with the merchant.

15. A non-transitory machine-readable medium having stored thereon machine-readable instructions executable to cause a machine to perform operations comprising:

receiving, via a user device of a user, a request for processing a payment transaction between the user and a merchant;

in response to receiving the request, causing the user device of the user to (i) capture an image representing an identifier of a financial service provider account associated with the merchant and (ii) initiate a communication with a merchant device associated with the merchant;

obtaining, via the user device and based on the communication, transaction information associated with the payment transaction;

instructing a payment provider computer system to push funds for the payment transaction from a funding source of the user to the financial service provider account based on the identifier and an amount associated with the payment transaction; and in response to obtaining an indication that the payment transaction has been processed from the payment provider computer system, transmitting a confirmation message to the merchant device based on a device identifier of the merchant device, wherein the confirmation message comprises the indication and a transaction identification number associated with the payment transaction.

16. The non-transitory machine-readable medium of claim 15, wherein the operations further comprise:
authenticating the user of the user device for accessing the funding source based on user credentials received via the user device, wherein the user credentials include one of a password, a security code, or biometric data of the user.

17. The non-transitory machine-readable medium of claim 15, wherein the financial service provider account associated with the merchant is a deposit-only account.

18. The non-transitory machine-readable medium of claim 15, wherein the communication is conducted between the user device and the merchant device via one of a Wi-Fi connection or a Near Field Communication (NFC) connection.

19. The non-transitory machine-readable medium of claim 15, wherein the operations further comprise:
receiving merchant credentials for the financial service provider account; and
transmitting the merchant credentials to the payment provider computer system.

20. The non-transitory machine-readable medium of claim 19, wherein the image comprises a two-dimensional code.

* * * * *